United States Patent
Miyake et al.

(10) Patent No.: US 9,387,548 B2
(45) Date of Patent: Jul. 12, 2016

(54) WIRE-CUT ELECTRICAL DISCHARGE MACHINING APPARATUS AND SEMICONDUCTOR WAFER MANUFACTURING METHOD

(75) Inventors: Hidetaka Miyake, Tokyo (JP); Tatsushi Sato, Tokyo (JP); Kazuhiko Fukushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 436 days.

(21) Appl. No.: 13/988,676

(22) PCT Filed: May 18, 2011

(86) PCT No.: PCT/JP2011/002772
§ 371 (c)(1),
(2), (4) Date: May 21, 2013

(87) PCT Pub. No.: WO2012/070167
PCT Pub. Date: May 31, 2012

(65) Prior Publication Data
US 2013/0240487 A1    Sep. 19, 2013

(30) Foreign Application Priority Data
Nov. 24, 2010    (JP) .................... 2010-261461

(51) Int. Cl.
*B23H 7/10*    (2006.01)
*B23H 1/02*    (2006.01)
(Continued)

(52) U.S. Cl.
CPC ............... *B23H 7/10* (2013.01); *B23H 1/028* (2013.01); *B23H 7/02* (2013.01); *B23H 7/065* (2013.01); *B28D 5/045* (2013.01)

(58) Field of Classification Search
CPC .......... B23H 1/028; B23H 7/02; B23H 7/065; B23H 7/10; B28D 5/045
See application file for complete search history.

(56) References Cited

U.S. PATENT DOCUMENTS 4,121,080 A * 10/1978 Janicke .................. B23H 7/105
 219/69.12
4,193,852 A *  3/1980 Inoue ...................... B23H 7/02
 219/69.12

(Continued)

FOREIGN PATENT DOCUMENTS

CN    201164919 Y    12/2008
CN    201164919 Y *  12/2008
(Continued)

OTHER PUBLICATIONS machine translation of Japan Patent document No. 10-58,237, Sep. 2015.*

(Continued)

*Primary Examiner* — Geoffrey S Evans
(74) *Attorney, Agent, or Firm* — Oblon, McClelland, Maier & Neustadt, L.L.P.

(57) ABSTRACT

In wire-cut electrical discharge machining apparatuses that simultaneously perform a plurality of cutting processes by engaging a wire between main guide rollers at a plurality of times, a wire-cut electrical discharge machining apparatus is provided that suppresses vibrations at cutting wire sections, to enable the cutting processes under steady-state accuracy. In addition to the main guide rollers, vibration-damping driven guide rollers or vibration-damping guides are included which form a plurality of cutting wire sections where the vibrations are suppressed by guiding the wire into place, and the positions of the cutting wire sections are thereby defined with respect to nozzles.

13 Claims, 8 Drawing Sheets

(51) Int. Cl.
  *B23H 7/06* (2006.01)
  *B28D 5/04* (2006.01)
  *B23H 7/02* (2006.01)

(56) References Cited

U.S. PATENT DOCUMENTS

| | | | | |
|---|---|---|---|---|
| 4,233,486 A | * | 11/1980 | Inoue | B23H 7/105 219/69.12 |
| 4,471,197 A | * | 9/1984 | Inoue | B23H 7/38 219/69.12 |
| 4,896,012 A | * | 1/1990 | Barbulescu | B23H 7/265 219/69.12 |
| 5,073,690 A | * | 12/1991 | Corbin | B23H 7/10 219/69.12 |
| 5,605,638 A | * | 2/1997 | Fujita | B23H 7/02 219/69.12 |
| 2003/0057187 A1 | * | 3/2003 | Baiardi | B23H 7/108 219/69.12 |
| 2010/0187203 A1 | * | 7/2010 | Bamberg | B23H 9/00 219/69.12 |

FOREIGN PATENT DOCUMENTS

| | | | | |
|---|---|---|---|---|
| JP | 54 17291 | | | 2/1979 |
| JP | 54 20485 | | | 2/1979 |
| JP | 60-249532 | A | * | 12/1985 |
| JP | 61-182725 | A | * | 8/1986 |
| JP | 62 106718 | | | 7/1987 |
| JP | 62 162427 | | | 7/1987 |
| JP | 62-264826 | A | * | 11/1987 |
| JP | 5 96421 | | | 4/1993 |
| JP | 10-58237 | A | * | 3/1998 |
| JP | 2000 94221 | | | 4/2000 |
| JP | 2000 107941 | | | 4/2000 |
| JP | 2000 109397 | | | 4/2000 |
| JP | 2003 89050 | | | 3/2003 |
| JP | 2006 297847 | | | 11/2006 |
| JP | 2010 5735 | | | 1/2010 |
| JP | 2010 207988 | | | 9/2010 |
| JP | 2010-207988 | A | * | 9/2010 |

OTHER PUBLICATIONS machine translation of Japan Patent document No. 2010-207,988, Sep. 2015.*
machine translation of China document No. 201164919, Sep. 2015.*
Combined Chinese Office Action and Search Report issued Oct. 8, 2014 in Patent Application No. 201180056169.3 (with English language translation and English Translation of Category of Cited Documents).
International Search Report Issued Jun. 14, 2011 in PCT/JP11/02772 Filed May 18, 2011.

* cited by examiner

WIRE-CUT ELECTRICAL DISCHARGE MACHINING APPARATUS AND SEMICONDUCTOR WAFER MANUFACTURING METHOD

TECHNICAL FIELD

The present invention relates to wire-cut electrical discharge machining apparatuses and cutting methods using the same, and methods of manufacturing semiconductor wafers that are obtained by cutting a semiconductor crystal.

BACKGROUND ART

In conventional wire-cut electrical discharge machining, when thin sheet-shaped wafers are made by cutting a columnar workpiece, many wires are used to perform simultaneous cutting. In order to increase productivity of the above cutting operation, a method is proposed in which one piece of wire is repeatedly engaged between a plurality of guide rollers. A wire-cut electrical discharge machining apparatus using this method is such that cutting wire portions are formed where a wire is disposed in parallel at fixed intervals, and by causing the cutting wire portions to come close to the workpiece and also using power feed contacts to separately feed power to each of the cutting wire portions, discharges are created simultaneously between each cutting wire portion and the workpiece, to perform cutting in parallel at a plurality of places (refer to Patent Document 1, for example).

Further, it is known that a wire-cut electrical discharge machining apparatus where one piece of wire is repeatedly engaged between each of a plurality of guide rollers, is equipped with a press rod that suppresses vibrations of power feed contacts and a cutting wire portion (refer to Patent Document 2, for example). Moreover, it is known that the wire vibration can also be suppressed by pressing the wire for wire-cut electrical discharge machining against the power feed contacts (refer to Patent Document 3, for example).

In addition, Patent Document 4 describes guide rollers formed with grooves, and power feed contacts that feed power to a plurality of wires, for a wire-cut machining apparatus.

RELATED ART

Patent Documents

Patent Document 1 JP-A-2000-94221
Patent Document 2 JP-A-2010-5735
Patent Document 3 JP-A-H05-96421
Patent Document 4 JP-UM-A-S54-17291

DISCLOSURE OF INVENTION

Problem that the Invention is to Solve

In a wire-cut electrical discharge apparatus such as in Patent Document 1, however, vibrations of guide rollers are not avoided which result from factors such as shape error or eccentricity of the guide roller, bearing vibration, and/or non-uniform rotation of a motor, so that the vibrations of the guide rollers are transmitted to the wire, thus causing vibrations to occur on the cutting wire sections that face with the workpiece. For this reason, in situations where semiconductor wafers are made by performing electrical discharge machining under conditions in which a discharge gap—a space between a wire and a workpiece—is microscopic, variation of only a few micrometers in the discharge gap, caused by vibration of the cutting wire section leads to unsteady discharges and thereby to lowered machining accuracy. As a result, a problem has been that there are created variations in width between machined grooves formed in the workpiece, resulting in a large variation in thickness between wafers that are cut off simultaneously.

Further, in wire-cut electrical discharge machining apparatuses such as in Patent Document 1 and Patent Document 2, a mechanism that suppresses wire vibrations is not equipped with a mechanism that regulates intervals between wires, so that when such vibration suppressing mechanism is applied to a discharge machining apparatus where a wire is repeatedly engaged with rollers, in some instances the wire intervals vary during a plurality of cutting processes. In some instances, the mechanism that suppresses wire vibration also includes the capability of transmitting an electrical signal such as of a power feed contact. In such an instance, the mechanism needs to be made up of an electrically conductive material, which is not, in a certain case, necessarily sufficient for a structure to be pressed against the wire.

Further, the power feed contacts in Patent Document 4 are located toward only one side of the workpiece and thus, grooves of the power feed contacts have structures that cannot sufficiently suppress lateral movements of the wire.

The present invention is directed to overcome the above problems, and an object of the invention is to provide a wire-cut electrical discharge machining apparatus and a semiconductor wafer manufacturing method, which are capable of performing a cutting process with high accuracy by suppressing vibrations of cutting wire sections.

Means for Solving the Problem

A wire-cut electrical discharge machining apparatus according to the present invention comprises a pair of guide rollers disposed in parallel and spaced apart from each other; a wire that forms a parallel wire section between the guide rollers by being engaged between the guide rollers at a plurality of times while separated from each other at fixed intervals, to travel with rotation of the guide rollers; a pair of vibration-damping guide rollers, disposed between the pair of guide rollers, that forms a plurality of cutting wire sections damped by making driven contact with the parallel wire section; and a plurality of power feed contacts that feeds power to each of the plurality of cutting wire sections.

Further, a wire-cut electrical discharge machining apparatus according to the present invention comprises a pair of guide rollers disposed in parallel and spaced apart from each other; a wire that forms a parallel wire section between the guide rollers by being engaged between the guide rollers at a plurality of times while separated from each other at fixed intervals, to travel with rotation of the guide rollers; a pair of vibration-damping guide, disposed between the pair of guide rollers, that forms a plurality of cutting wire sections damped by making contact with the parallel wire section; and a plurality of power feed contacts that feeds power to each of the plurality of cutting wire sections.

Advantageous Effects of the Invention

The apparatus according to the present invention can suppress vibrations of cutting wire sections, to achieve wire-cut electrical discharge machining with steady-state operation even under micro-gap discharge, thus improving machining accuracy.

MODE FOR CARRYING OUT THE INVENTION

Embodiment 1

Figure 1:
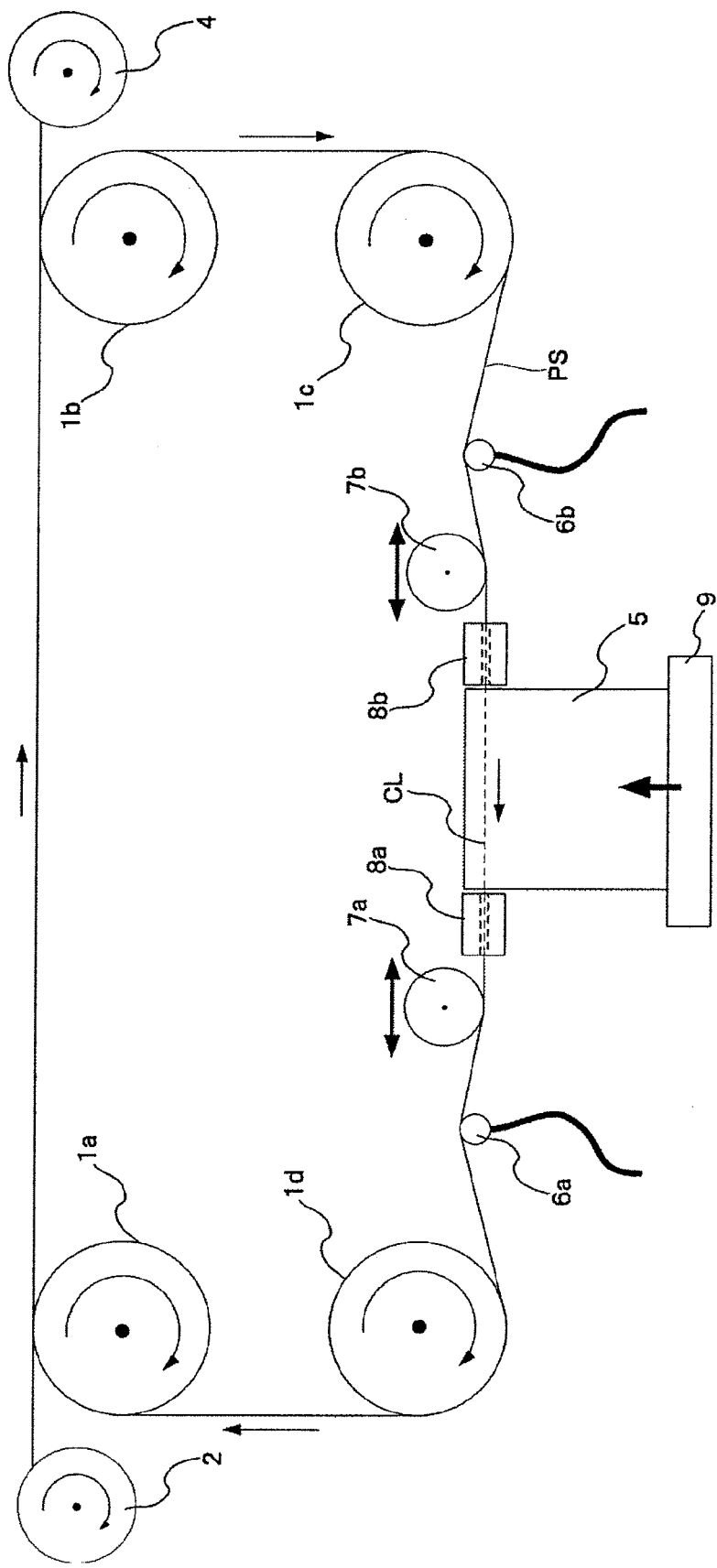
FIG. 1 is a side view showing a configuration of a wire-cut electrical discharge machining apparatus according to Embodiment 1.

FIG. 1 is a side view showing a configuration of a chief part of a wire-electrical discharge machining apparatus according to Embodiment 1 of the present invention. Main guide rollers 1a, 1b, 1c and 1d are chief guide rollers that constitute a wire travel system. In the wire-electrical discharge machining apparatus, four main guide rollers of the same diameter are disposed in parallel and spaced apart from each other. One piece of wire 3, unreeled from a wire bobbin 2, spans sequentially the space between the four main guide rollers 1a through 1d, and is repeatedly engaged with each roller, with a constant spacing between segments of the wire. The wire 3 travels with the rotations of the main rollers 1a through 1d, and finally reaches a wire winding bobbin 4. The main guide rollers 1c, 1d are disposed at positions that are on opposite sides of a workpiece 5. The wire 3 is stretched between both main guide rollers under constant tension, thereby forming a section of a plurality of parallel wires, PS where the wires are spaced apart from each other in the longitudinal direction of the main guide roller. In the present specification, the parallel wire section PS indicates the section from where the wire is advanced from the main guide roller 1c to where the wire is engaged with the main guide roller 1d. Within the above parallel wire section PS, cutting wire sections CL represents a linearly stretched region of the wire, inclusive of its portion located opposite the workpiece 5. FIG. 1 shows a state in which the cutting wire sections CL travels into the workpiece 5 after cutting of the workpiece 5 is started.

Power feed units 6a, 6b, disposed in contact with the parallel wire section PS, are electrodes that separately supply voltage pulses to the cutting wire sections CL, and FIG. 1 shows that two units are disposed. Further, vibration-damping guide rollers 7a, 7b are disposed on the parallel wire section PS between the power feed unit 6a, 6b, and the wire 3 is always maintained in an engagement relationship with the rollers to thereby guide the wire 3 into place. More specifically, the vibration-damping guide rollers 7a, 7b are guide rollers which are placed between a pair of the main guide rollers and driven in contact with the parallel wire section PS—having a smaller diameter than those of the main guide rollers; the vibration-damping guide rollers, while supporting the wire 3, serve to form a plurality of the cutting wire sections CL where segments of the wire 3 are stretched linearly. Wire vibration is suppressed at the cutting wire sections CL between the guide rollers 7a, 7b, and the travel positions of the wire sections are substantially invariable, as will be described later.

Moreover, nozzles 8a, 8b are disposed in an opposite relationship with each other in the region of the cutting wire sections CL; a jet of machining fluid is discharged from the nozzles 8a, 8b toward the cutting portion of the workpiece 5 along the wire sections CL. The wire sections CL pass through the insides of the nozzles 8a, 8b, but are not in contact with the inner surfaces of the nozzles. A workpiece table 9 is a stage that ascends and descends with the workpiece 5 mounted thereon, and an arrow drawn on the workpiece table 9 indicates its ascending direction.

The wire 3 is engaged with only a partial circumference (about a quarter turn) of each of the main guide rollers 1a through 1d, and turns around all the four main guide rollers 1a through 1d. The guide rollers 1a through 1d forms a path from the wire bobbin 2 to the wire winding bobbin 4, and are configured to keep space that prevents the workpiece 5 from interfering, after the workpiece passes through the wire cutting sections CL, with the other sections of the wire. The guide rollers 1c, 1d are drive guide rollers, and the guide rollers 1a, 1b, disposed above them, are driven guide rollers. Drive guide rollers rotate with their axes driven by motors, while driven guide rollers are rotated by the travel of the wire without having any drive force generated. The vibration-damping guide rollers 7a, 7b are the driven guide rollers disposed so that the wire 3 engages with the guide rollers by making contact with the parallel wire section PS, and rotate by being driven with the travel of the wire 3. Referring to FIG. 1, arrows drawn around axes of the main guide rollers 1a through 1d indicate the rotation direction of each main guide roller, and arrows drawn along the wire 3, the travel direction of the wire 3 (FIG. 6, as will be described later, shows a three-dimensional engagement of the wire 3 with the rollers, and the power feed units 6a, 6b, in the wire-cut electrical discharge machining apparatus according to the present embodiment). The guide rollers 1a through 1d, which are rollers having a cylindrical cored bar wound with e.g., urethane rubber, have configurations such that both ends of the cored bar is bearing-supported and rotatable. The urethane rubber, because it has a high friction coefficient with the wire, is suitable to prevent the wire from slipping on the guide rollers. Also formed on surfaces of the guide rollers 1a through 1d with which the wire makes contact are a plurality of grooves at the same intervals as the wire engagement pitch, and the wire is engaged into each of the grooves. At this time, an engagement pitch—the distance between the cutting wire sections CL, equally spaced and arranged in parallel—is invariable. For the semiconductor wafers, the pitch is on the order of, for example, 0.1 mm through 0.8 mm. At the drive main guide rollers, force for pulling the wire can be obtained, while at the driven main guide rollers, rotation force for driving the rollers to turn can be obtained.

These guide rollers and the workpiece 5 are submerged in machining fluid, and each cutting wire section CL, facing with the workpiece 5, performs in parallel and simultaneously the cutting process in the machining fluid.

The vibration-damping guide rollers 7a, 7b are the driven guide rollers having a higher degree of accuracy in shape, rotation and installation when compared with the main guide rollers 1a through 1d. The two damping guide rollers are employed at positions that are on opposite sides of the workpiece 5. The guide rollers 7a, 7b are configured such that they are pressed against the parallel wire section PS stretched and thereby the wire 3 is engaged with part of their circumferences. As a result, the wire between the guide rollers 7a and 7b are stretched linearly and the travel direction of the wire 3 comes bent, so that the wire 3 is maintained in an engaged relationship with them at all times during its travel. The wire accompanied by vibrations before it is engaged with the guide roller 7b is positively engaged therewith, thereby interrupting the vibration of the wire 3 that travels while vibrating. Likewise, the vibration applied to the wire advanced from the guide roller 7a is interrupted by the guide roller 7a. As a result, the two guide rollers 7a, 7b, while being rotated with the wire travel by friction with the wire 3, creates the condition in which there is almost no wire vibration in the straight region between the guide rollers. In other words, the guide rollers 7a, 7b can suppress vibration that transmits from the main guide rollers to the cutting wire sections CL, and precisely guide the wire 3 into place so that the microscopic travel position of the wire is invariable.

The vibration-damping guide rollers 7a, 7b can bend the travel direction of the wire segments that continue to the cutting wire sections CL, but they do not have functions that keep the spaces for the workpiece 5 to pass through the sections CL. On the roller surfaces with which the wire makes contact, there are provided wire guide grooves at the same intervals as those of the cutting wire sections CL, and each segment of the wire is engaged in the respective grooves. The double headed arrows, shown above the guide rollers 7a, 7b in FIG. 1, indicate directions in which the rollers 7a, 7b are movable in the apparatus.

The power feed units 6a, 6b are assemblies of power feed contacts K, arranged at the same intervals as the wire engagement pitches, and the power feed contacts K are electrically insulated from each other. Each power feed contact K feeds power to the respective cutting wire sections CL, through which machining current flows. Employed for the power feed contacts K are those having, for example, groove-like wire guides and a full-circle or a part-circle in cross-section. The power feed contacts K are disposed to be rotatable so that their contacting positions with the wire can be changed by regularly rotating the feed contacts.

Figure 2:
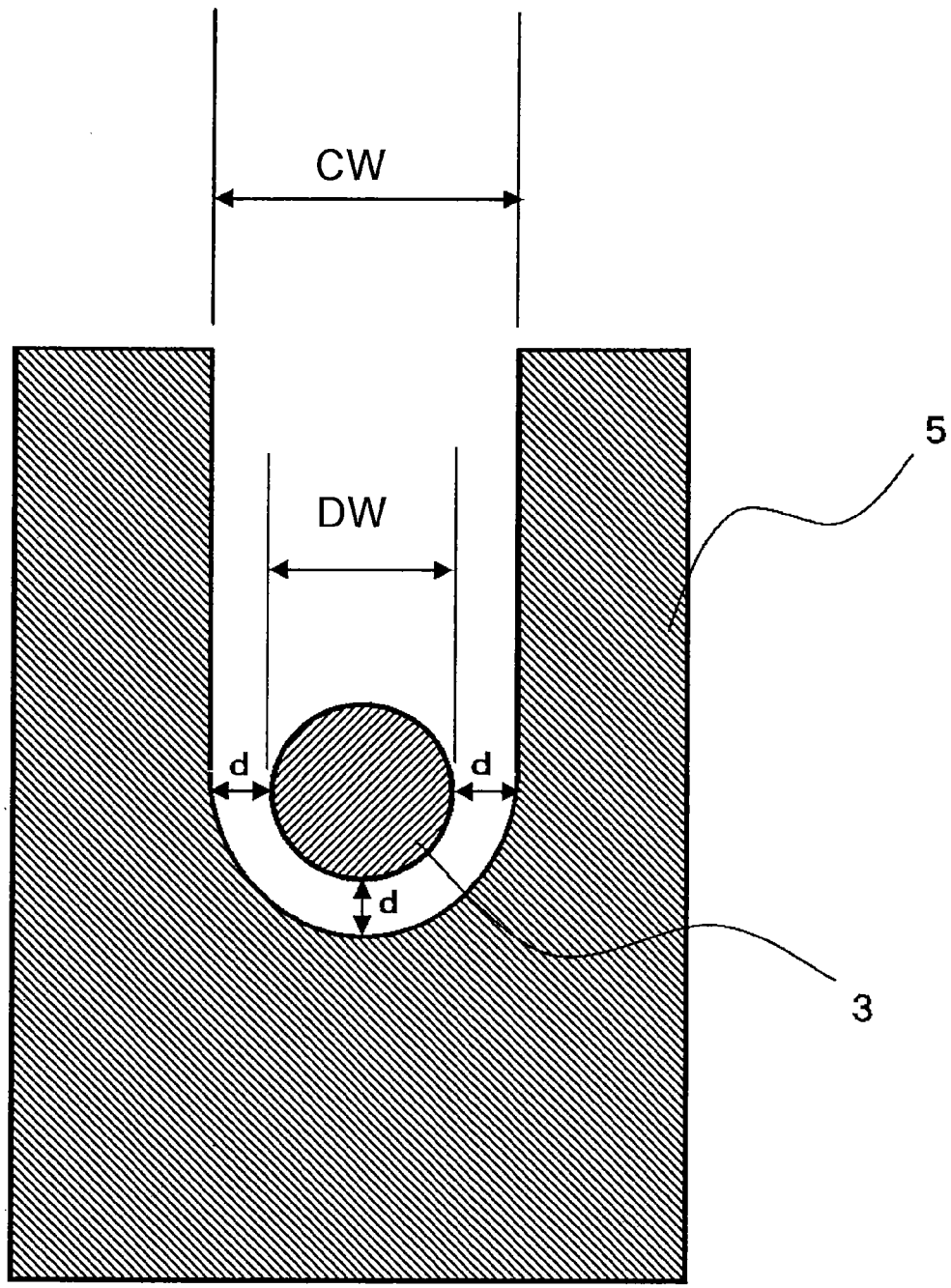
FIG. 2 is a cross-sectional view showing a positional relationship between a wire and a workpiece.

FIG. 2 is a cross-sectional view showing a positional relationship between the wire 3 in the cutting wire sections and the workpiece 5 during machining. In the figure, reference numeral d represents a discharge gap length; reference numeral DW, a wire diameter; and reference numeral CW, a machining width. The nozzles 8a, 8b are machining-fluid-jet discharging devices for supplying machining fluid to the above discharge gap, to wash out machined debris. They are disposed on both sides of the workpiece 5 along the cutting wire sections CL.

Figure 3:
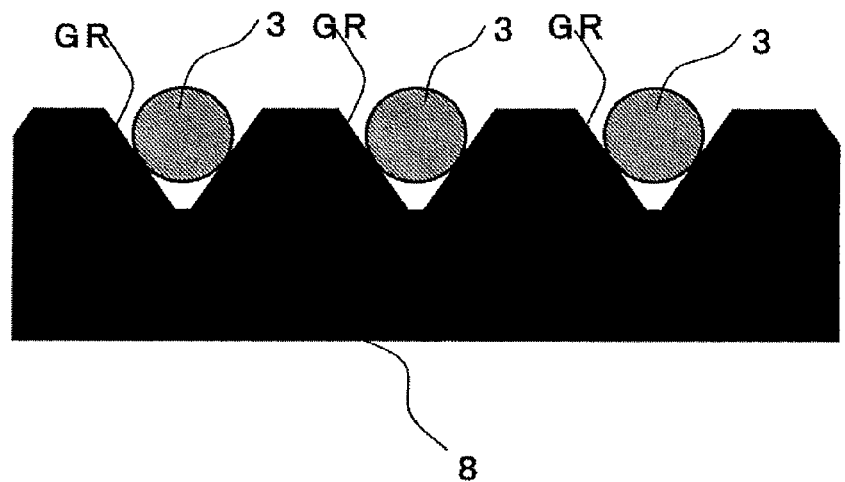
FIG. 3 is a cross-sectional view showing a partial structure of a vibration-damping guide roller according to the present invention.

FIG. 3 is a cross-sectional view showing an example of the structure of wire guide grooves for the vibration-damping guide roller, and illustrates a partially enlarged portion close to the surface of the guide roller. Grooves GR have V-shaped cross-sections. When segments of the wire 3 are engaged in the respective grooves GR, each segment of the wire 3 is supported at two places on side surfaces of the V-shaped grooves GR. As a result, the vibration is suppressed that occurs in the lateral direction relative to the wire travel direction (in the longitudinal direction of the roller, the horizontal direction on the sheet plane of FIG. 3). The wire is engaged with the vibration-damping guide rollers 7a, 7b, so that while the wire 3 is in contact with, and turning around, the guide rollers, movement of the wire 3 remains relatively invariant with respect to those of the guide rollers. For that reason, the vibrations of the cutting wire sections CL are stopped.

Moreover, fitting the segments of the wire 3 into the grooves GR of V-shaped cross-section creates an advantageous effect of gripping the wire 3 segments, so that the wire slip on the guide rollers 7a, 7b, each having a small portion with which the wire 3 is engaged, is suppressed, thereby allowing for stabilization of the driven rotation of the guide rollers 7a, 7b.

The operation of the wire-cut electrical discharge machining apparatus according to the present embodiment will be described next. The wire-cut electrical discharge machining is such that a workpiece is cut by generating arc discharges in a microscopic discharge gap filled with machining fluid such as deionized water, between a wire and the workpiece. Specifically, the surface of the workpiece is heated by arcing into high temperature, and the machining fluid present in the discharge gap is explosively evaporated, blowing off the high temperature portion of the workpiece. The blown off portions turn into machined debris, which floats and drifts in the machining fluid. The discharge gap length d is also called inter-electrode distance because the cutting wire sections CL and the workpiece 5 serve as the discharge electrodes.

During machining, the wire 3 is continuously unreeled from the wire bobbin 2, travels by the rotation of the main guide rollers 1a through 1d, and is advanced out into the wire winding bobbin 4. By adjusting the rotation speed of each of the wire bobbin 2 and the wire winding bobbin 4, tension of each parallel wire during its travel is controlled. When the wire 3 travels in a stable condition, the tension of the travelling wire 3 is maintained invariant.

In operation of the electrical discharge machining, while rotating the main guide rollers 1c, 1d to cause the wire 3 to travel and after the workpiece 5 is spaced apart, by a predetermined inter-electrode distance, from and disposed opposite the cutting wire sections CL, voltage pulses are applied to the wire cutting sections CL and the workpiece table 9 is elevated according to the cutting speed. With the inter-electrode distance maintained constant, by relatively moving the parallel cutting sections and the workpiece, to perform the continuous arc discharge, machined grooves are formed corresponding to the paths, in the workpiece, through which the cutting wire sections CL have passed. Thus, the thickness of wafer to be cut off is a length calculated by subtracting from the engagement pitch the machined groove width (machining width) that is a cut portion of the workpiece 5 (FIG. 2 indicates that the machining width CW is a value calculated by adding twice the inter-electrode distance d to the wire diameter WD). In order to make the machining width small, preferably the wire 3 is of smaller diameter, a steel wire on the order of 0.1 mm is practically appropriate, and preferably a wire is used whose diameter is further reduced to a value such as 0.07 mm. In addition, in order to have a proper discharge start voltage, coating such as with brass may be applied to the surface of steel wire.

Here, when some vibration is transmitted to the cutting wire sections CL, the sections CL make contacts, within the machined grooves in the workpiece 5, with the bottoms of the machined grooves, establishing a short circuit. Alternatively, because of the sections CL being much far away from the machining surface, an open condition is developed that allows no discharge to be created. These occur repeatedly, so that the discharge machining is performed under unsteady-state conditions. Meanwhile, if the wire travel can be stabilized and in addition, accuracy of the wire position can be improved, then the pitch between the cutting wire sections CL can be narrowed, thus allowing thinner wafers to be cut off from the workpiece 5 in the form of an ingot.

In conventional wire-cut electrical discharging machining, the discharge gap distance where the cutting wire sections are located opposite the workpiece (distance between electrodes) is something like 50 micrometers. When the ingot of a semiconductor crystal is cut into semiconductor wafers, most of wafers have a thickness of 0.5 mm or less, and from a viewpoint of cost reduction, the reduction of the cut portion (machining width) is an important challenge. In order to reduce the cut portion, it is desirable to make the inter-electrode distance to 20 micrometers or less, and preferably to the order of 10 micrometers, as well as to have smaller-diameter wires; thus, a technique is needed that suppresses the amplitude of the wire vibration to on the order of 1 micro-meter or less.

The present invention is intended to achieve high degree of requirement for the above wire vibration-damping; as the foregoing, a feature of the invention is to include, as first technical elements, the vibration-damping guide rollers of high accuracy and, as a second technical element, nozzles through the inside of which the wire 3 passes with no contact with its inside surface. The vibration guide rollers of high accuracy, 7a, 7b effectively suppress the wire vibration due to the main guide rollers, while the nozzle 8a, 8b are of types that create no deflection or vibration resulting from the flow of machining fluid because of a jet of the machining fluid being discharged along the cutting wire sections CL. Further, the vibration guide rollers of high accuracy allow the wire 3 to travel without making contact with inner walls of the nozzles; thus, there is no occasion for the travel to cause a breakage of the wire, or a variation of the travel position.

In addition, the repetition of the pulse discharge is known to cause wire vibration to occur; however, by suppressing the discharge current to a small value and performing machining in a current region where the wire vibration is substantially negligible, the wire vibration due to the discharge can be suppressed as well.

From experiment results, the inventors have discovered that by combining together the vibration-damping rollers, the nozzles from which a jet of the machining fluid is discharged along the cutting wire sections CL, and the foregoing machining conditions, the amplitude of the wire vibration in the discharge gap is suppressed to 1 micrometer or less.

In Embodiment 1, the power feed units 6a, 6b are disposed toward the outsides of the guide rollers 7a, 7b with respect to the workpiece 5, so that each power feed contact K is allowed to apply the voltage to the respective cutting wire sections CL. The wire 3 is engaged with the rollers along power feed surfaces of the power feed contacts K and, while traveling, makes contact with the power feed contacts K to establish sliding contacts and thereby feed power to the cutting wire sections CL. If the sections CL come free from the feed contacts K during machining, then arc discharges occur between the both, causing great damage to the feed contacts K; thus, the sliding contacts need to be established positively.

In order to adjust the amounts of press by the power feed units 6a, 6b, a mechanism (not shown) is disposed that perpendicularly moves the feed units 6a, 6b with respect to the wire. The length of a portion where the wire 3 is in contact with the power feed contact K represents a sliding length. The sliding length is controllable by the amounts of pressing applied by the feed unit 6a, 6b against the parallel wire section PS. In other words, the smaller the amounts of pressing, the smaller the sliding length, while the larger the amounts of pressing, the larger the sliding length. The amounts of pressing may be defined by the moving distance of the wire 3 depressed, or by the pressing force. Adjusting the sliding length allows the contact resistance to be adjusted and the value of the discharge current per voltage pulse to be fine adjusted. Thus, even if consumable parts, such as the wire 3 and the feed units 6a, 6b, are replaced, then the machining condition prior to the replacement can easily be replicated, and reproducibility of the condition is ensured every machining batch.

In a wire-cut electrical discharge machining, there is a phenomenon such that machined debris of a workpiece, accompanied by discharging in the fluid, adheres to the surface of a wire. For that reason, in a method where the wire is engaged between guide rollers in many turns, the wire 3 is repeatedly used for the electrical discharge machining and thereby the debris film that has adhered to the wire 3 grows in thickness, as well as some portions being gradually shaved off from the surface of the wire 3. As a result, the surface of the wire 3 is turned into a surface with microscopic asperities, from a smooth metal surface at the initial phase, such as of brass or molybdenum. The wire having the machined debris adhered thereto have a property like a wire-saw; thus, if such a wire is engaged with a fixed member, such as a die guide, and slides on the surface of the member, abrasion is generated on the member, forming a groove into which the wire is fitted. The formation of the groove lowers tension of the wire 3, thereby increasing the vibration; thus, there is limitation of having vibration-damping capability by, for example, pressing the power feed contacts K against the wire 3.

In contrast, since the vibration-damping rollers rotate with the wire, abrasion is very little in amount even if the saw-shaped wire is guided into place, so that the vibration-damping capability will not be suppressed even if the electrical discharge machining is performed for a long time.

Figure 4:
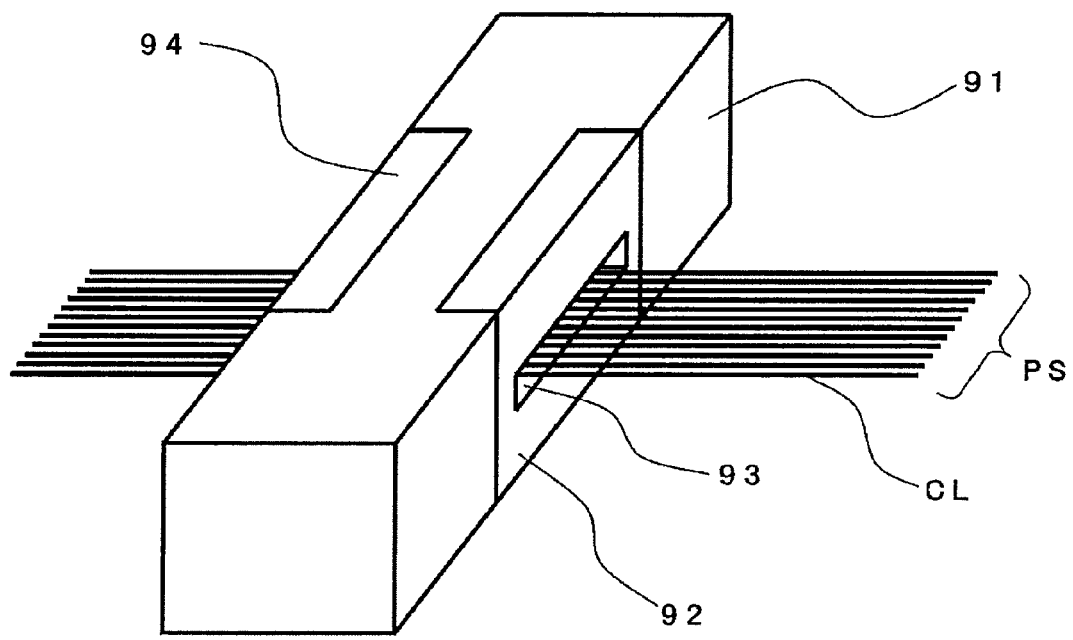
FIG. 4 is a perspective view showing a nozzle according to the present invention.
Figure 5:
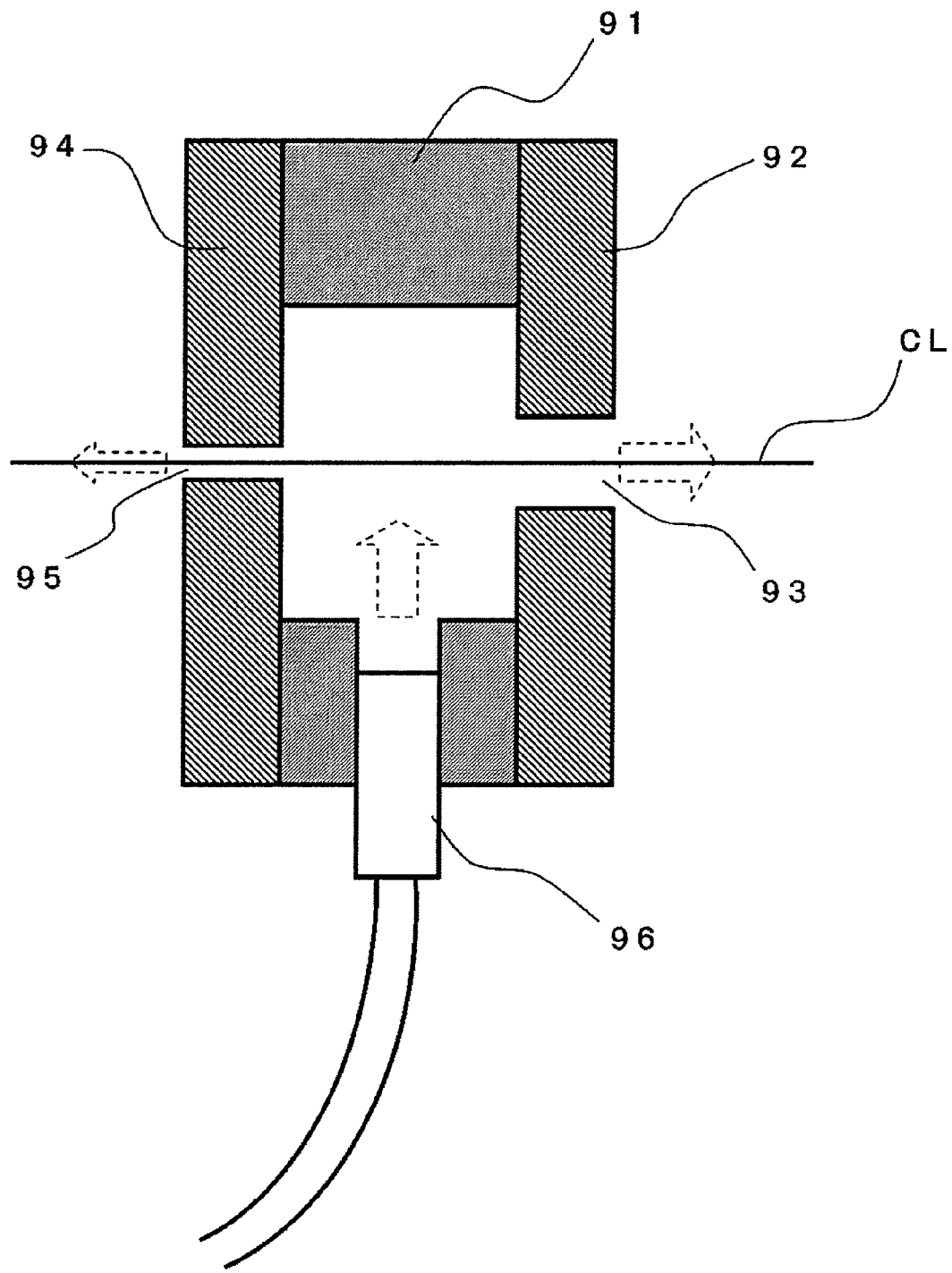
FIG. 5 is a cross-sectional view showing a structure of the nozzle according to the present invention.

FIG. 4 is a perspective view showing an outer appearance of the nozzle; FIG. 5 is a cross-sectional view of the central portion of the nozzle, showing its internal portion. a spout orifice-constituting plate member 92 and an escape orifice-constituting plate member 94 are fitted into a body 91 having a through-hole, with the plate member 92 being formed with a spout orifice 93 that is located opposite the workpiece 5. Further, the parallel wire section PS, which continues to the plurality of cutting wire sections CL, is passed through the spout orifice 93. The escape orifice-constituting plate member 94 has an escape orifice 95 for the cutting wire sections CL to pass through the body 91 with no contact with the body inside surface. The machining fluid is supplied from supply piping 96 at fixed flow velocity, and its jet is discharged from the spout orifice 93 and the escape orifice 95. Consequently, the jet of the machining fluid is discharged along the cutting wire sections CL from the spout orifice 93, and partially flows out from the escape orifice 95. Because the cutting wire sections CL and the flow of the machining fluid are in parallel, the wire sections CL are not warped by the fluid flow, nor vibrated by the flow's varying its velocity.

The positional distance between each of the nozzles 8a, 8b and the workpiece 5 is few dozens micrometers through few hundreds from the side surface of the workpiece 5. The machining fluid is continuously supplied to the supply piping 96 from an external machining fluid supply device, not shown.

Phantom line arrows in FIG. 5 diagrammatically show the flow of the machining fluid, with sizes of the arrows representing the flow velocity. Since the aperture of the spout orifice 93 is larger as compared with that of the escape orifice 95, a large part of the machining fluid is flown out from the spout orifice 93. The escape orifice 95, because not intended for discharging the machining fluid, is a minimally narrow aperture. Since the spout orifice 93, however, is located closer to the workpiece 5, the machining fluid flow is reflected by the workpiece 5, so that the flow velocity of the fluid that flows out from the escape orifice 95 become larger as compared with the velocity from the spout orifice 93. When the workpiece 5 is thick in size, the machining fluid supply pressure needs to be increased in order to take out the machined debris in the discharge gap, and thus the flow velocity from the escape orifice 95 becomes high.

In the wire-cut electrical discharge machining, the wire travels at a speed on the order of, e.g., 40 m/min. through 200 m/min. Because of this, if the wire 3 makes contact with the inner wall surface of the nozzle, then some portion is shaved off from the surface of the inner wall, so that the wire is caught on the surface, causing a wire break. For that reason, during the wire travel, clearance needs to be always retained between the periphery of the wire and the nozzle inner wall surface, in particular, the escape orifice 95. In other words, the nozzle does not have a die shaped guide therewithin, so that the wire 3 travels through the nozzle inside with no contact with its inside surface. For that reason, the positions of the vibration-damping guide rollers 7a, 7b for determining the position of advancing the cutting wire sections CL is carefully adjusted so that the sections CL may not make contact with the nozzle inner wall surface.

The spout orifices 93 of the nozzles 8a, 8b are disposed along the cutting wire sections CL, thereby forming machining fluid flows in the direction in which the fluid flows collide toward the discharge gaps. By supplying the machining fluid from both sides of the machined grooves of the workpiece 5, machined debris can be removed from the discharge gaps even in a long machined groove, to supply additional machining fluid to the gaps.

Here, semiconductor ingots have a diameter of 2 inches (approx. 50 mm) or more, and in most instances, 4 inches (approx. 100 mm) or more. Because of this, when semiconductor wafers are manufactured by cutting by wire-cut electrical discharge machining, preferably an entire workpiece is submerged into machining fluid so that a discharge gap is positively filled with the fluid. Thus, nozzles are also submerged into the fluid together with the workpiece. By submerging components such as the workpiece 5, the nozzles and the neighboring guide rollers into the machining fluid, the entire machined grooves are submerged into the fluid. Thus, the machined debris flows upward in the grooves, allowing the debris to be effectively taken out from the discharge gap.

Figure 6:
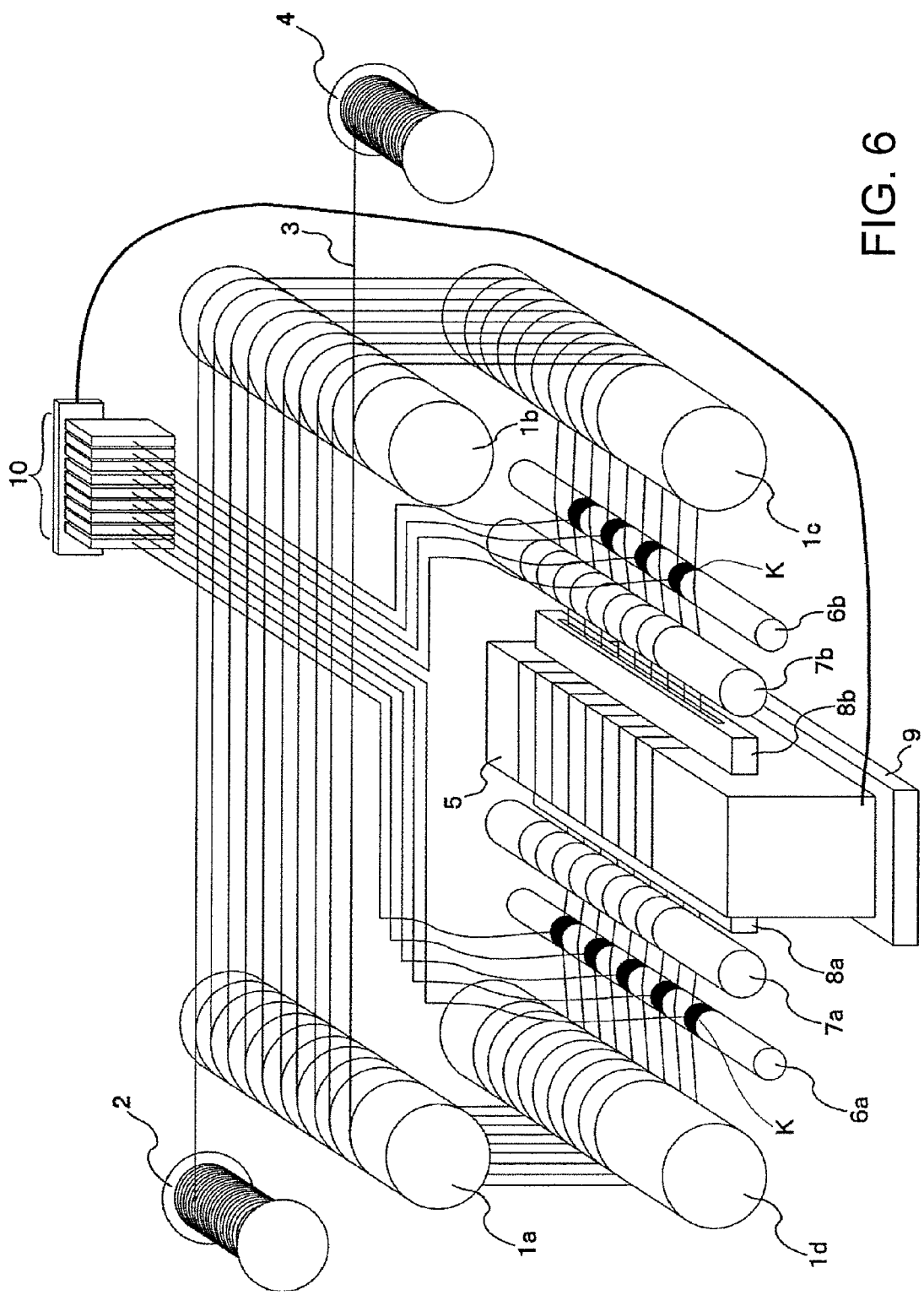
FIG. 6 is a perspective view showing the configuration of the wire-cut electrical discharge machining apparatus according to Embodiment 1.

The relationship between the vibration-damping guide controllers 7a, 7b against the wire 3 engaged with the main guide rollers 1a through 1d and the power feed units 6a, 6b, and the nozzles 8a, 8b will be described next. FIG. 6 is a perspective view of the main guide rollers 1a through 1d of the wire-cut electrical discharge machining apparatus according to Embodiment 1 shown in FIG. 1, and illustrates the positional relationship between the cutting wire sections CL that travel in parallel.

The nozzles 8a, 8b are disposed close to the workpiece 5 at symmetrical positions that are on opposite sides of the workpiece 5, with the vibration-damping guide rollers 7a, 7b being disposed between the nozzles 8a, 8b and the drive guide rollers 1d, 1c, respectively. In other words, the guide roller 7a is disposed between the guide roller 1d and the nozzle 8a, and the guide roller 7b, between the guide roller 1c and the nozzle 8b. Further, the power feed units 6a, 6b, are disposed opposite the guide rollers 7a, 7b, respectively, with respect to the parallel wire section PS of the wire 3, between the guide rollers 1d, 1c.

With this arrangement of the rollers, the two guide rollers 7a, 7b can damp vibration of the wire 3 and retain invariable positions of the wire sections CL with respect to the nozzles 8a, 8b. Assuming that the arrangement without any guide rollers is used, when the amounts of pressing applied by the power feed units 6a, 6b is caused to vary in order to control the contact resistance of the power feed contacts K, the position of the wire sections varies with respect to the escape orifice 95. Accordingly, there arises the need for moving the nozzles in the directions to the power feed units in order to agree with the position of the feed units, so that the mechanism becomes complicate. More specifically, the use of the guide rollers 7a, 7b enables the wire of the wire sections CL to be advanced horizontally with respect to the spout orifice 93 and the escape orifice 95, regardless of the amounts of pressing applied by the feed units. Moreover, even if the wire shaves off some portions from the feed contacts K and thereby the sliding positions on the contacts vary, the positions of the wire sections CL with respect to the nozzles can be maintained in a stable state.

The power feed units 6a, 6b are pressed, between the main guide rollers 1d, 1c and the vibration-damping guide rollers 7a, 7b, respectively, on the side opposite to the guide rollers with respect to the wire segments that continues to the cutting wire sections CL. For that reason, the wire 3 is bent into chevron shapes whose peaks are at the power feed units 6a, 6b, stabilizing the contact condition of the feed contacts K with the wire. Further, retaining this condition increases the respective wire engagement lengths of the guide rollers 7a, 7b and the guide rollers 1c, 1d, and increasing the friction resistance makes it difficult for the wire that is engaged with the guide rollers to slip. As a result, an advantageous effect is that the travel of the wire being advanced by means of rotation drive force is stabilized, and the wire engaged with the rollers is difficult to run off the engaged positions, thereby remarkably improving capability of feeding power to the high-speed traveling wire, and stability of engagement of the wire. Even when the electrical discharge machining apparatus performs a long, continuous operation, this effect enables cutting of large-diameter ingots, without causing problems resulting from the wire travel.

Further, the guide rollers 7a, 7b are disposed between the nozzles 8a, 8b and the power feed units 6a, 6b, respectively, in the direction of stretch of the cutting wire sections CL. An advantage with this arrangement is that a jet of the machining fluid discharged from the escape orifice 95 of the nozzle toward the power feed units will not collide with the feed units. This is because that since, as the foregoing, the feed units 6a, 6b are pressed upward in FIG. 6, views of the sliding portions are blocked by the guide rollers 7a, 7b, when viewed from the escape orifice 95 of the nozzle. Because a jet of the machining fluid that is discharged at high speed from the escape orifice 95 does not reach the feed units, variation of the wire contact resistance in the sliding portions—which is a problem arising when the machining fluid flows collide—will not occur, so that the discharge machining is achieved under steady-state accuracy.

In Embodiment 1, of the wire 3 segments that have passed through the nozzle 8a, wire segments of the cutting wire sections which have not received power from the power feed unit 6b are powered by making contact with the power feed unit 6a disposed between the vibration-damping guide roller 7a and the drive guide roller 1d. More specifically, the feed units 6a, 6b each feed power to the cutting wire sections CL every other wire. The cutting wire sections CL that have passed the feed unit 6a are engaged with the drive guide roller 1d and thereafter, with the main guide rollers 1a, 1b, and then, with the drive guide roller 1c.

FIG. 6 shows an in-progress state of cutting the workpiece 5, with the workpiece 5 being cut to the middle thereof. Each power feed contact K of the feed units 6a, 6b is connected to a machining power supply unit 10, which in turn is connected to a control unit (not shown) of the wire-cut electrical discharge machining apparatus. The grooves of each guide roller, with which the wire 3 is engaged, are shown simplified in solid lines.

Because the main guide rollers 1a through 1d are disposed in order to cause the wire 3 to travel, the use of a mechanism system where positions of axes of the rollers are able to move is not advantageous from a viewpoint of maintaining accuracy of the rollers rotation. Therefore, the rollers are fixedly disposed at intervals that correspond to an estimated maximum width of the workpiece 5.

However, the workpiece 5 does not necessarily have a fixed width. In this case, preferably, various sizes of ingots can be cut with a single apparatus. On the other hand, in order to damp the wire vibration, the nozzle and the vibration-damping guide rollers need to be disposed close to the workpiece 5. For that reason, the nozzles 8a, 8b and the guide rollers 7a, 7b are each equipped with a move mechanism (not shown) so as to be able to translate in the travel direction of the wire 3 and in the travel directions (including the reverse direction). The positions of disposing the nozzles 8a, 8b and the guide rollers 7a, 7b can thereby be adjusted according to the size of ingot—the workpiece 5.

Here, the power feed units 6a, 6b may also include a similar move mechanism. In this case, since the distance up to the workpiece 5 varies to cause impedance of the cutting wire sections CL to change, adjustments need to be made for parameters, as required.

When it comes to the diameter of each roller, the main guide rollers 1a through 1d need a large diameter sufficient to ensure the wire contact length, in order to prevent slipping at the time of high-speed turn. In contrast to this, the vibration-damping guide rollers 7a, 7b do not produce any drive force, and nor do they involve with wire advancement and wire winding; therefore, even if the wire slightly slips on the rollers with which the wire is engaged, it presents no problem. Accordingly, it is acceptable that the guide rollers 7a, 7b may have smaller diameters than those of the guide rollers 1a through 1d.

Reduction in diameter of the guide rollers 7a, 7b can increase accuracy of the roller shape, thereby reducing vibration resulting from the guide rollers 7a, 7b per se. Further, since the distance between each feed unit 6a, 6b and the workpiece 5 can be shortened, the size of the apparatus and a voltage drop in the cutting wire sections CL can be reduced, as well as low-frequency wire vibration being able to be prevented.

Each cutting wire section CL has impedance, including electric resistance of the wire 3, between neighboring cutting wire sections CL; thus, in order for the wire sections CL to be isolated from one another, it is not preferable that the other conductive passages are formed. Accordingly, the contact portions of the main guide rollers and the vibration-damping guide rollers with the wire need to be made up of an insulative material.

Since the vibration-damping guide rollers do not need to produce drive force for advancing the wire, a material may be used having small frictional resistance between their surfaces and the wire. Thus, highly hard insulative ceramics can be employed as the material for the guide rollers 7a, 7b. The use of ceramic guide rollers remarkably reduces groove deformation that is due to the wire's biting into rubber rollers, which is easy to occur when using such rollers. Steady shapes of the grooves prevent generation of the wire vibration associated with the groove deformation, and an advantageous effect is created that stabilizes the positions of the cutting wire sections CL with respect to the nozzles.

A ceramic material to be used include, for example, aluminum oxide, silicon nitride, boron nitride, aluminum nitride, or alternatively, combined ceramics of the forgoing, or machinable ceramics.

The wire-cut electrical discharge machining, because the machining speed is independent of the degree of hardness of the workpiece, is particularly effective to a material with a high degree of hardness. A target material for the workpiece 5 includes, for example, metal, such as tungsten, or molybdenum, serving as a sputter target; ceramics, such as polycrystalline silicon carbide (silicon carbide) used for various structural members; a semiconductor raw material, such as monocrystalline silicon or monocrystalline silicon carbide to be made into wafer substrates for manufacturing semiconductor devices; and monocrystalline or polycrystalline silicon to be made into solar cell wafers. A problem with, in particular, the silicon carbide is that a mechanical wire-saw method exhibits low productivity and low accuracy of machining. The apparatus according to the present invention can achieve the production of silicon carbide wafers while the high productivity is being compatible with the high accuracy of machining.

An example of modification of the present embodiment includes pressing the power feed units from above downward against the cutting wire sections CL, in terms of the positional relationship in FIG. 2. Even if this is done, power can be supplied independently to each segment of the wire. However, in order to attain wire travel stability by maintaining secure contact lengths of the vibration-damping guide rollers and the main guide rollers with the wire, preferably another auxiliary guide roller is additionally placed between the power feed units and the drive guide rollers, as well as the guide rollers 7a, 7b being pressed upward from below the wire 3.

Here, there are used two sets of the drive main guide rollers in Embodiment 1, and either set may be changed to driven one. However, since the maximum tension of the wire is determined according to its sectional area, preferably the tension to be applied is suppressed using a plurality of drive guide rollers when a thin wire is employed for reduction of the machining width. The avoidance of excessive wire tension allows for increase of the number of turns of the wire engagement and for reduction of diameter of the wire, thus enhancing productivity.

Further, while Embodiment 1 shows an example where one piece of the wire 3 is engaged with 4 sets of the main guide rollers, 3 sets of the main guide rollers, for example, can be configured to be disposed. In other configurations, not limited to the above embodiment, if one piece of the wire 3 is repeatedly engaged round the rollers to form the parallel wire section PS, then the specific configuration is not in particular limited thereto.

As in the foregoing, the apparatus according to the present embodiment comprises one piece of wire, engaged between the main guide rollers at a plurality of times while separated from each other at fixed intervals, that travels with rotation of the main guide rollers; the parallel wire section PS disposed between the main guide rollers 1c, 1d; a pair of the vibration-damping guide rollers 7a, 7b disposed so as to make driven contact with this parallel wire section; and the power feed units 6a, 6b that feed power to each segment of the wire 3 of the parallel wire section PS, and since the wire stretched between the vibration guide rollers 7a, 7b is formed into the cutting wire sections CL opposite the workpiece 5, wire vibration in the cutting wire sections CL is suppressed, allowing wire-cut electrical discharging machining to be performed with high accuracy.

The apparatus further includes a pair of the nozzles 8a, 8b disposed between the vibration-damping guide rollers 7a, 7b, and the nozzles 8a, 8b discharge a jet of the machining fluid along the wire 3 toward the workpiece 5, and the wire travels through the spout orifice of the nozzles 8a, 8b with no contact with the nozzles 8a, 8b, so that no wire vibration occurs because of the machining fluid flows, nor does wire rupture occur. In addition, an advantageous effect is that since the machined debris can effectively be taken out from the discharge gap, the discharge is performed under steady-state operation, thereby improving the machining speed and accuracy for electrical discharge machining.

Further, the diameters of the guide rollers 7a, 7b is made to be smaller than those of the main guide rollers, so that compact size wire-cut electrical discharge machining apparatuses can be provided that are unlikely to generate wire vibration.

Still further, since the guide rollers 7a, 7b and the nozzles 8a, 8b are configured to be movable in the travel direction of the cutting wire sections CL, the workpiece 5 can be machined, with high accuracy, into various cutting sizes within the range of restriction specified by means such as the main guide rollers 1c, 1d.

Still yet further, since grooves with V-shaped cross-sections—into which each segment of the wire 3 is engaged corresponding to the respective cutting wire sections CL—are formed in the surfaces of the guide rollers 7a, 7b, the lateral wire vibration can be suppressed, achieving the electrical discharge machining, with high accuracy, that provides steady machined groove widths.

Yet still further, the use of highly hard ceramics as the material of the guide rollers 7a, 7b enables the stabilized wire travel to be maintained over a long time period, thereby having the sustained effect of reducing the wire vibration.

Further, since essentially only roller bodies are replaceable in the guide rollers 7a, 7b, and even if the grooves machined on the rollers are abraded because of the long-time use, causing each of the V-shaped cross-sections—into which the cutting wire sections CL are engaged one by one—to deform gradually, then the replacement of the roller bodies allows the electrical discharge machining to be performed under high steady-state accuracy. Still further, the contact portions of the guide rollers 7a, 7b can be re-used by cutting off and grinding the worn grooves on the roller surfaces and by remaking of the groove—reworking new grooves. The remaking of the groove reduces the diameters of the guide rollers 7a, 7b to smaller ones; however, since the depths of the grooves are about twice the diameter of the wire to be used, the diameter is reduced by at most 500 micrometers at one time remaking of the groove. Therefore, the guide rollers 7a, 7b, if having a diameter of 20 mm or more, can achieve a similar vibration-damping effect by adjusting the amount of press by the rollers against the wire.

Yet further, an advantageous effect is that since the guide rollers 7a, 7b, are configured to be disposed opposite the power feed contacts K with respect to the parallel wire section PS, the wire travel position is stabilized, performing the machining under steady-state accuracy. Still yet further, since the machining fluid does not collide with the feed contacts K, no wire vibration due to the machining fluid flows occurs at the sliding portions, and thereby no power feed to the wire 3 is blocked.

An advantageous effect is that the above configuration suppresses vibrations at the cutting wire sections CL to maintain the uniform discharge gap, and causes electrical discharge machining to be performed under steady-state accuracy even in the long-time machining, thereby enabling making a plurality of wafers with a small variation in thickness at the same time.

Moreover, by the use of the wire-cut electrical discharge discharging apparatus that produces the above advantageous effect, the workpiece 5 that contains a hard material such as silicon carbide can be cut into slices with high productivity.

Embodiment 2

Figure 7:
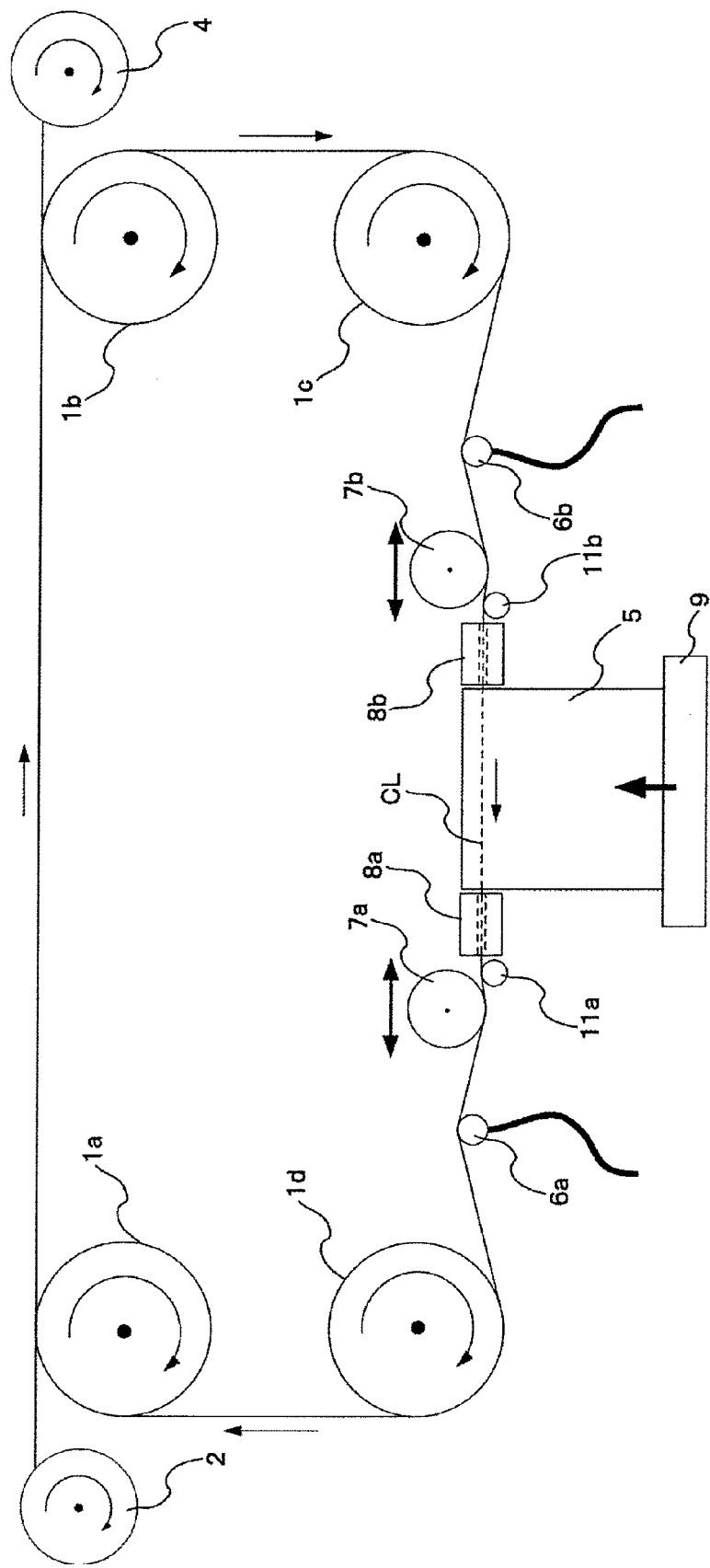
FIG. 7 is a side view showing a configuration of a wire-cut electrical discharge machining apparatus according to Embodiment 2.

The configuration and operation of Embodiment 2 will be described below. FIG. 7 is a configuration diagram of the wire-cut electrical discharge machining apparatus according to Embodiment 2, viewed from the directions of rotation axes of the guide rollers. The discharge machining apparatus according to the present embodiment has many similarities in configuration and operation to those of the foregoing Embodiment 1. Therefore, the configuration and operation different from those in Embodiment 1 will be described with omission of their similar descriptions.

The plural grooves machined on the circumferential surfaces of the vibration guide rollers are all constant in depth; however, when the machined debris and other foreign substances stick in the grooves, there is a possibility of variations in depth in engagement of the wire with the rollers. As the engaged depth varies, the cutting wire sections CL swing upward and downward with rotations of the rollers. More specifically, since the wire 3 supporting positions in the foregoing grooves vary depending on the positions of the grooves, the upper and lower positions of the wire 3 also vary with rotations of the damping guide rollers 7a, 7b.

Although the vibration-damping guide rollers are permitted to have smaller diameters than the main guide rollers, mechanical errors cannot be eliminated to zero, so that there is a possibility of rotational wobbling resulting from, for example, eccentricity of the roller axis. The problem arises in that when these factors cause the inter-electrode distance—which is established to be a microscopic distance—to vary, the discharge machining is performed under unsteady state conditions, so that the machining accuracy is lowered.

In the present embodiment, in order to overcome the problem, sliding wire pressing devices are provided between the vibration-damping guide rollers and the nozzles. The sliding wire pressing devices, which are made of, e.g., cylindrical insulative ceramics, are disposed in parallel with the direction of the rotation axes of the vibration-damping guide rollers. In addition, preferably grooves for guiding the wire into place are machined on the surfaces of the sliding wire pressing devices.

Referring to FIG. 7, the wire 3, advanced from the drive main guide roller 1c, makes contact with the power feed unit 6b and thereafter passes the vibration-damping guide roller 7b while making contact with the lower part of the roller to rotate it. The wire 3, immediately after advanced from the wire guide grooves of the guide rollers 7b, passes a sliding wire pressing device 11b while partially making contact with the upper surface of the wire pressing device 11b, or with the insides of the grooves machined on the surface of the wire pressing device 11b. Thereafter, it passes through nozzle 8b and through the workpiece 5, and then passes within the nozzle 8a disposed symmetrically with the nozzle 8b relative to the workpiece 5. Further, the cutting wire sections CL, after passing the nozzle 8a, partially makes contact with the upper surface of a sliding wire pressing device 11b, or with the insides of grooves machined on the surface of the wire pressing device 11a, to pass through the pressing device. The wire sections CL are next engaged with the guide roller 7a to pass its lower part, and then are engaged with the guide roller 1d.

In order to minimize the abrasion of the sliding wire pressing device, caused by its contact with the wire to which workpiece debris has adhered, the amount of press against the wire 3 needs to be limited to a very little distance. The rollers are pressed, according to the vertical wire vibration amplitude to be estimated at the vibration-damping guide rollers, upward by the order of, for example, 10 through 30 micrometers, to cause the rollers to make contact with the wire. Thus, although the travel direction microscopically varies in the sections between the guide rollers 7a, 7b because of the sliding wire pressing devices 11a, 11b, the degree of variation is very little, and the wire stretched condition between them is substantially straight. By the fact that the wire 3 makes point contact with, and slides on, the cylindrical sliding wire pressing device, vertical (upward and downward direction) microscopic vibration is suppressed relative to the wire travel direction, eliminating the variation of inter-electrode distance, thus performing the electrical discharge machining under steady-state accuracy. The sliding wire pressing devices 11a, 11b suppress the microscopic vibration by making contact with the cutting wire sections CL. As in the foregoing, wire guide grooves are made also in the surfaces of the pressing devices 11a, 11b, and it is possible for the grooves to have functions to guide the wire sections CL into place.

With the foregoing apparatus configuration, the vertical microscopic vibration of the cutting wire sections CL can be suppressed which results from the adhesion of foreign substances on the guide rollers 7a, 7b and the eccentricity of roller axes, so that the plural pieces of wafers equal in thickness can be cut from the workpiece 5 at a time.

Here, when the cutting wire sections CL are passed above the guide rollers 7a, 7b, it will be adequate if they are passed below the wire pressing devices 11a, 11b.

Because on the wire pressing devices, wire segments that, corresponding to each cutting wire section CL, makes contact with the wire pressing devices need to be electrically isolated from each other, the wire pressing devices 11a, 11b are made of an insulative material. Further, because sliding friction occurs between the wire pressing devices and the wire 3, preferably each wire pressing device is of a hard material, such as boron nitride, silicon nitride, aluminum nitride, aluminum oxide, or silicon carbide, which has high hardness and abrasion resistance. In addition, it may use a material coated with a film that is of a non-conductive hard material, such as diamond-like carbon (DLC).

The sliding wire pressing devices 11a, 11b, because structurally separated from the respective nozzles 8a, 8b, are easy to alter, by rotating them, their contact portions with the wire, and to make replacements of them, so that they can be used as auxiliary wire vibration dampers, as required.

An advantageous effect is that, by disposing, as described above, the wire pressing devices 11a, 11b with which the cutting wire sections CL make contact, the vertical vibrations of the traveling cutting wire sections CL are suppressed and the variation in the inter-electrode distance is prevented, so that the electrical discharge machining is performed under steady-state accuracy, enhancing accuracy of machining.

Moreover, the surfaces of the wire pressing devices are coated with films of insulative hard material such as DLC, so that abrasion due to the wire travel is reduced, thus enabling electric discharging under steady-state operation to be maintained for a long time period.

Embodiment 3

Figure 8:
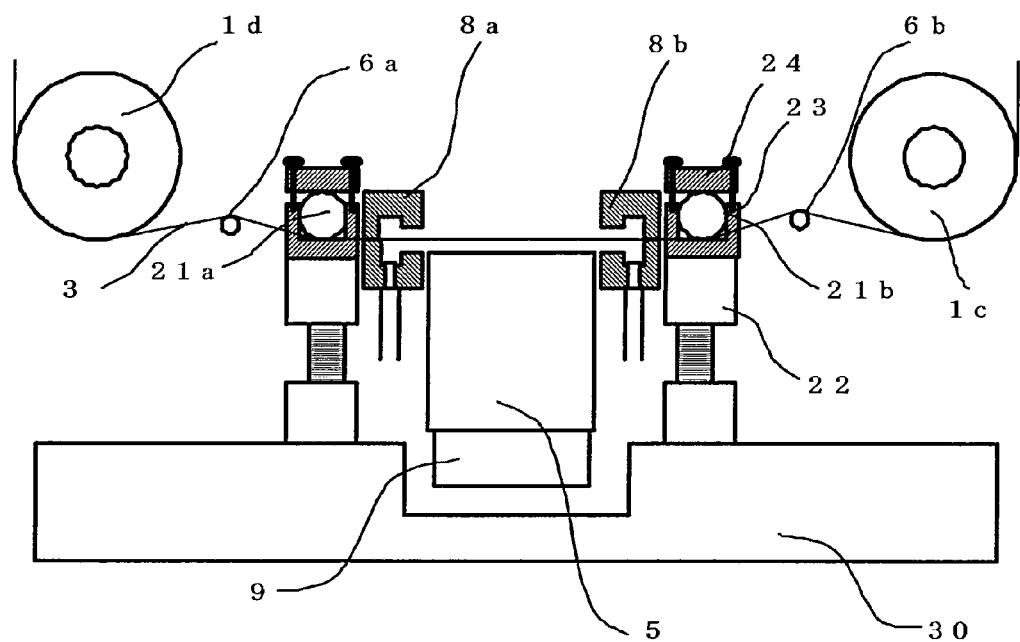
FIG. 8 is a cross-sectional view showing a configuration of a wire-cut electrical discharge machining apparatus according to Embodiment 3.

FIG. 8 is a cross-sectional view showing the chief part of a wire-cut electrical discharge machining apparatus according to Embodiment 3 of the present invention. The configuration of the discharge machining apparatus and the workpiece according to the present embodiment are mostly common to that in FIG. 6 described in Embodiment 1; thus, without explanation of such a configuration, the configuration and operation will be described in terms of, chiefly, the neighboring portion of the parallel wire section PS that is different from those in Embodiment 1.

Referring to FIG. 8, between a pair of power feed units 6a, 6b in the parallel wire section PS, a pair of vibration-damping guides 21a, 21b is pressed in the opposite direction, relative to the wire, to that in which the feed units 6a, 6b are pressed. The portion between the pair of damping guides 21a, 21b corresponds to the cutting wire sections CL. The pair of nozzles 8a, 8b is disposed inside the pair of damping guides 21a, 21b in the cutting wire sections CL.

The damping guides 21a, 21b are secured by a support member 22, a frame 23 and a cover 24 so as not to be displaced with respect a machining bed 30 that establishes a reference point for controlling the position of the workpiece 5.

Figure 9:
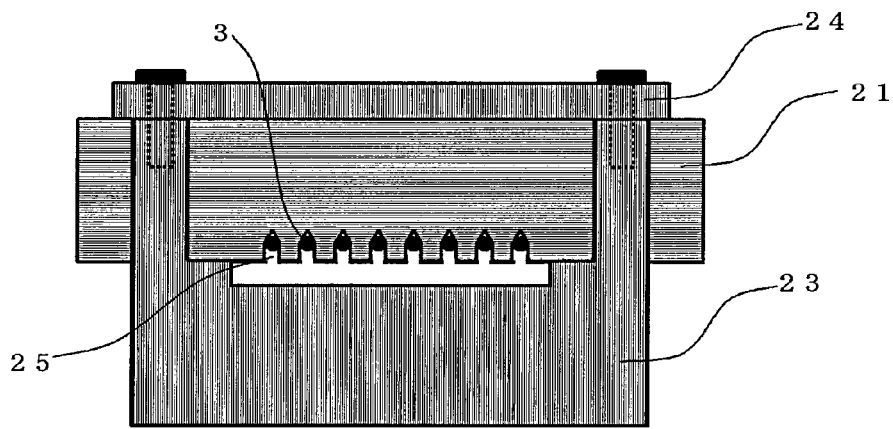
FIG. 9 is another cross-sectional view showing the configuration of the wire-cut electrical discharge machining apparatus according to Embodiment 3.

FIG. 9 is a cross-sectional view of the damping guides 21a, 21b, viewed from the guide roller 1b. Referring to FIG. 9, the damping guides 21, which are secured by the frame 23 and the cover 24, are formed with a plurality of grooves 25 having V-shaped bottoms. The plurality of grooves 25 are formed separated at fixed intervals, and the depth of each groove 25 is determined to be equal. The wire 3 passes through the insides of the grooves 25, and their inner surfaces are machine ground so that frictional resistance between the surfaces and the wire 3 is suppressed to small values. In addition, the damping guides 21 have circular shapes in cross-section, as shown in FIG. 8, so that their contact portions with the wire 3 may have a certain degree of length. The diameter thereof is determined to be 10 mm or more, for example, on the order of 20 mm.

Further, the support members 22 take on structures that allow their heights to be changed so that the amounts of pressing applied by the damping guides 21 can be adjusted, and no movable mechanism is provided for the rest of the direction.

Moreover, the damping guides 21 are formed of an insulative hard material. It will be adequate if the insulative hard material, which is highly hard with high insulation, is a material including diamond-like carbon or ceramics such as of silicon nitride and alumina. Even if the damping guides 21 are made up of a non-insulative metallic material, it will be adequate if the grooves 25 are covered with the insulative hard material.

Next, descriptions will be provided in terms of a method of setting up of the wire-cut electrical discharge machining apparatus according to the present embodiment, and methods of the wire-cut electrical discharge machining and of manufacturing a semiconductor wafer using the wire-cut electrical discharge machining apparatus.

First, after removing the cover 24, the wire 3 is engaged with the guide rollers 1c, 1d and the like. Subsequently, the vibration-damping guides 21 are placed, with the positions of grooves of the guides 21 aligned to the wire 3, on the wire 3 engaged within the frame 23. Next, the cover 24 is placed from above onto, and secured to, the frame 23. Subsequently, the electrical discharge machining apparatus is submerged as a whole into the machining fluid, the wire is caused to travel, and power is fed from the feed contacts K of the power feed units 6a, 6b. The wire-cut electrical discharge machining can be done in this way. When the workpiece 5 is a semiconductor or a semiconductor ingot, this method achieves the manufacture of semiconductor wafers.

According to the wire-cut electrical discharge machining in the present embodiment, the vibration of the wire 3 is suppressed, as well as the position of the wire 3 being regulated with accuracy, by the pair of vibration-damping guides 21 each having a plurality of the grooves 25, so that the gaps between the workpiece 5 and the cutting wire sections CL can be maintained to be a few micrometers through a few dozens micrometers. Thus, the wire-cut electrical discharge machining can be continued under steady-state pulse discharge. Moreover, an advantageous effect is that the damping guides 21 ensure that the wire 3 can be pressed against the power feed contacts K, so that stable power feed can be done to each of the parallel segments of the wire 3.

Further, the pair of damping guides 21 according to the present embodiment, because they can each move only in the direction of machining the workpiece 5, are difficult to move in other directions, thus enabling highly controllable machining. Moreover, since the guides 21 have no rotation mechanism (bearing), no adjustments for the wobbling are needed and thus, the wire vibration can easily be suppressed by a simple set-up.

In addition, also when the damping guides 21 have worn, the contacting positions of the guides 21 of circular cross-sections with the wire 3 can easily be changed by using the guides 21 after rotation of them, and thus a similar machining condition can easily be continued.

Further, because the cylindrical damping guides 21 are determined to have diameters of 10 mm or more, the contact portions of the guides 21 with the wire 3 lengthen, and thus the contact pressures are spread and reduced, so that the abrasion on the wire 3 surface and those of the guides 21 can be suppressed. Besides, the fact that the damping guides have larger diameters prevents irregular distances between each segment of the wire 3 in the cutting wire sections CL and the workpiece, and breakage of the wire 3 due to the shortage of strength of the guides 21. In addition, the guides 21 or the grooves 25 thereof will not be abraded easily because of their being made of the insulative hard material.

Moreover, a jet of the machining fluid to be discharged from the nozzle 8 to the power feed unit 6, is directed chiefly toward the workpiece 5, while the fluid that directs toward the unit 6, because there is the damping guides 21 disposed in-between, is not directly squirted at the feed unit 6, either. Consequently, an advantage effect is that the wire vibration at the feed units 6 caused by the collision of the machining fluid flow is suppressed, which causes stable power to be fed to the wire 3 and thereby electrical discharge machining is performed under steady-state accuracy, so that the machining speed and accuracy of the electric discharging wire-saw are improved, resulting in higher productivity of the wafers.

Further, pressed by the power feed units 6, the parallel wire section PS is warped along the contact surface of the feed units 6, and this warp represents an amount of ironing of the cutting wire sections CL. More specifically, as the amounts of pressing are reduced, the ironing amount decreases, while the former increases as the latter increases. In this way, the ironing amount is controllable as the amounts of pressing applied by the feed units 6 against the parallel wire section PS stretched between the damping guides 21 and the respective guide rollers 1d, 1c, for example.

Here, the direction in which the feed units 6 presses against the wire 3 at the parallel wire section PS may be determined to be from above the section PS. In this situation, it will be adequate to press the damping guides 21 upward from below the parallel wire section PS, and to make ironing of the cutting wire sections CL using the units 6.

Also preferably, the damping guides 21 are disposed at positions maximally close to the orifice of the nozzle 8 through which the wire passes. It will be adequate if the heightwise positions of disposing the guides 21a, 21b (in the direction of travel of the workpiece during machining) are determined so that the guide surfaces pressing against the wire 3 are generally at a height of the nozzle orifice.

Embodiment 4

Figure 10:
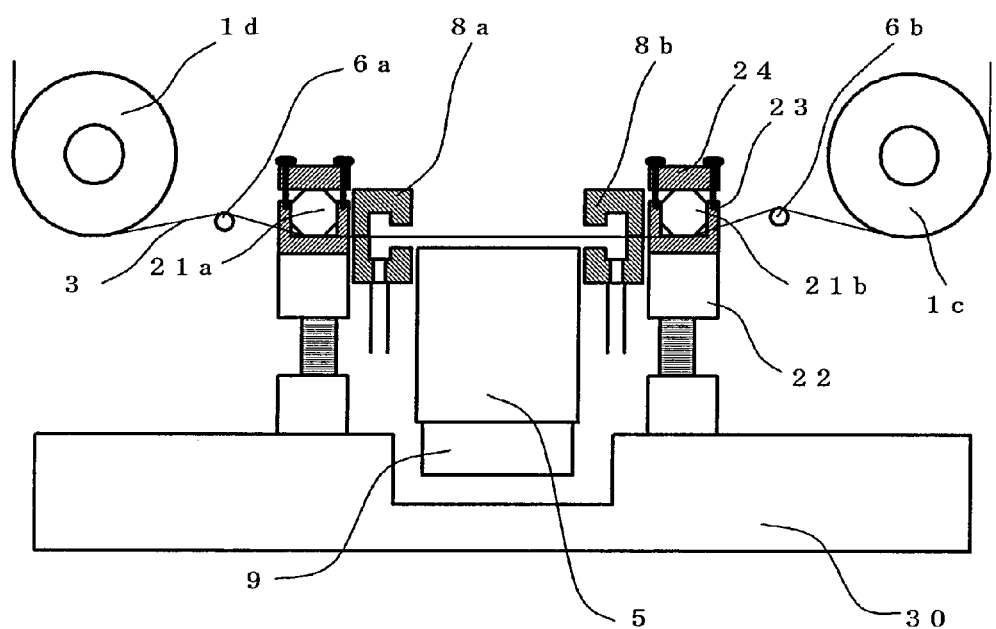
FIG. 10 is a cross-sectional view showing a configuration of a wire-cut electrical discharge machining apparatus according to Embodiment 4.

FIG. 10 is a cross-sectional view showing a configuration of a wire-cut electrical discharge machining apparatus according to Embodiment 4 of the present invention. The configurations of the discharge machining apparatus and the workpiece according to the present embodiment are mostly common to those in Embodiment 3 and thus, without explanation of them, the configuration and operation will be described in terms of, chiefly the neighboring portion of the parallel wire section PS that is different from those in Embodiment 3.

Referring to FIG. 10, the vibration-damping guides 21a, 21b are regular polygonal columns having regular polygons in cross-section. In the electrical discharge machining apparatus according to the present embodiment, one of the sides of columns of the guides 21 having shapes of regular polygonal column is pressed against the wire 3. In addition, the guides 21 are accommodated in the frame 23 and the cover 24, and secured therein. The grooves corresponding to the pitch of the wire 3 are formed in the column sides. The polygon, if being a quadrangle or more, is acceptable because its angles between sides are not too large.

In the wire-cut electrical discharge machining apparatus according to the present embodiment, the damping guides 21 have shapes of polygonal column, so that the guides 21 make contact with the wire 3 at some certain length and thus their contact areas increase. Consequently, as compared with the situation where the guides 21 have circular cross-sections, the contact pressure at portions against which the wire 3 is pressed can be reduced by dispersing the pressure. Therefore, the abrasion of the wire 3 and guides 21 can be suppressed, and further the variation of position of pressing against the wire 3, and the variations of the amount of pressing against the wire and of the contact pressure, can be lessened. When the abrasion causes the grooves to be deepened, or the amount of pressing against the wire and the contact pressure to be lowered, a microscopic wire vibration occurs in some situations; however, the wire-cut electrical discharge machining apparatus according to the present embodiment allows for suppression of the microscopic wire vibration, achieving highly accurate machining.

Figure 11:
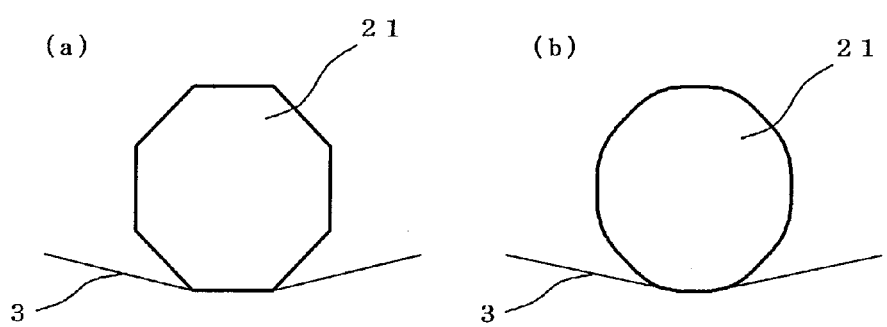
FIG. 11 is a set of side views showing cross-sectional configurations of a vibration-damping guide of the wire-cut electrical discharge machining apparatus according to Embodiment 4.

The present embodiment describes an example of the damping guides 21 having polygonal cross-sections. When their cross-sections are of polygon, stress concentration in some instances occurs at angled portions. For that reason, the angled portions of cross-sectional shapes of the guide 21 may be rounded as in FIG. 11 that shows their cross-sectional shapes. FIG. 11 is a set of views showing the cross-sections of the vibration-damping guide of the wire-cut electrical discharge machining apparatus according to the present embodiment. FIG. 11(a) shows an example of polygon (octagon in this example) in cross-section, and FIG. 11(b), an example of the polygonal cross-section with rounded angled portions.

With the wire-cut electrical discharge machining apparatus that uses the damping guides 21 an example of whose cross-sectional shape is shown in FIG. 11(b), stress to be applied to the angled portions of the guides 21 can be dispersed, and in addition the variation of the contact pressure between the wire 3 and the guides 21 can be reduced, so that machining can be performed under high steady-state accuracy. Another advantageous effect is to prevent the wire 3 from breaking.

Note that in the above four embodiments, two power feed units are disposed that have the workpiece 5 therebetween; however, the present invention is also applicable to an example where a single unit is disposed.

REFERENCE NUMERALS 1a, 1b, 1c, 1d Guide roller
2 Wire bobbin
3 Wire
CL Cutting wire sections
PS Parallel wire section
4 Wire winding bobbin
5 Workpiece
6a, 6b Power feed unit
K Power feed contact
7a, 7b Vibration-damping guide roller
GR Groove
8a, 8b Nozzle
9 Workpiece table
10 Machining power supply unit
11a, 11b Sliding wire pressing device
21a, 21b Vibration-damping guide 22 Support member
23 Frame 24 Cover
25 Grooves
30 Machining bed

The invention claimed is:

1. A wire-cut electrical discharge machining apparatus, comprising:
a pair of guide rollers disposed in parallel and spaced apart from each other;
a wire that forms a parallel wire section between the pair of guide rollers by being engaged between the pair of guide rollers at a plurality of times while separated from each other at fixed intervals, to travel with rotations of the guide rollers;
a pair of vibration-damping guide rollers, disposed between the pair of guide rollers, that forms a plurality of cutting wire sections damped by making driven contact with the parallel wire section;
a plurality of rotatable power feed contacts that feed power to each of the plurality of cutting wire sections; and
a pair of nozzles disposed between the pair of vibration-damping guide rollers, the pair of nozzles each include an escape orifice configured to discharge machining fluid away from the rotatable power feed contacts.

2. The wire-cut electrical discharge machining apparatus of claim 1, wherein the pair of nozzles are provided through which the plurality of cutting wire sections passes with no contact with each nozzle, and each nozzle includes a spout orifice that discharges a jet of machining fluid along the plurality of cutting wire sections.

3. The wire-cut electrical discharge machining apparatus of claim 1, wherein the vibration-damping guide rollers are disposed opposite the rotatable power feed contacts with respect to the parallel wire section inclusive of the plurality of cutting wire sections.

4. The wire-cut electrical discharge machining apparatus of claim 1, wherein the vibration-damping guide rollers each include grooves of V-shaped cross-sections, into which the wire is engaged corresponding to each of the plurality of cutting wire sections, at contacting positions with the parallel wire section.

5. The wire-cut electrical discharge machining apparatus of claim 1, wherein the contacting portions of the vibration-damping guide rollers with the parallel wire section are made of insulating ceramics.

6. A wire-cut electrical discharge machining apparatus comprising:
a pair of guide rollers disposed in parallel and spaced apart from each other;
a wire that forms a parallel wire section between the pair of guide rollers by being engaged between the pair of guide rollers at a plurality of times while separated from each other at fixed intervals, to travel with rotations of the guide rollers;
a pair of vibration-damping guide rollers, disposed between the pair of guide rollers, that forms a plurality of cutting wire sections damped by making driven contact with the parallel wire section; and
a plurality of rotatable power feed contacts that feed power to each of the plurality of cutting wire sections,
wherein a nozzle is provided through which the plurality of cutting wire sections passes with no contact with the nozzle, and the nozzle includes a spout orifice that discharges a jet of machining fluid along the plurality of cutting wire sections, and
wherein the vibration-damping guide rollers and the nozzle are disposed movably in a direction of travel of the wire.

7. A wire-cut electrical discharge machining apparatus comprising:
a pair of guide rollers disposed in parallel and spaced apart from each other;
a wire that forms a parallel wire section between the pair of guide rollers by being engaged between the pair of guide rollers at a plurality of times while separated from each other at fixed intervals, to travel with rotations of the guide rollers;
a pair of vibration-damping guide rollers, disposed between the pair of guide rollers, that forms a plurality of cutting wire sections damped by snaking driven contact with the parallel wire section; and
a plurality of rotatable power feed contacts that feed power to each of the plurality of cutting wire sections,
wherein a nozzle is provided through which the plurality of cutting wire sections passes with no contact with the nozzle, and the nozzle includes a spout orifice that discharges a jet of machining fluid along the plurality of cutting wire sections, and
wherein a sliding wire pressing device that makes contact with the cutting wire sections is disposed between the vibration-damping guide rollers and the nozzle.

8. A wire-cut electrical discharge machining apparatus, comprising:
a pair of guide rollers disposed in parallel and spaced apart from each other;
a wire that forms a parallel wire section between the pair of guide rollers by being engaged between the pair of guide rollers at a plurality of times while separated from each other at fixed intervals, to travel with rotations of the guide rollers;

a pair of vibration-damping guides, disposed between the pair of guide rollers and each having a plurality of grooves spaced apart from each other at the fixed intervals, that forms a plurality of cutting wire sections damped by making press-contact with the parallel wire section;

a plurality of rotatable power feed contacts, each disposed outside the cutting wire sections, that feed power to each of the plurality of cutting wire sections; and a pair of nozzles disposed between the pair of vibration-damping guides, the pair of nozzles each include an escape orifice configured to discharge machining fluid away from the rotatable power feed contacts.

9. The wire-cut electrical discharge machining apparatus of claim 8, wherein grooves of the vibration-damping guides are formed of an insulative hard material.

10. The wire-cut electrical discharge machining apparatus of claim 9, wherein the insulative hard material is ceramics or diamond-like carbon.

11. The wire-cut electrical discharge machining apparatus of claim 8, wherein the vibration-damping guides have circular or N-polygonal cross-sections, N being four or more.

12. The wire-cut electrical discharge machining apparatus of claim 11, wherein the grooves have V-shaped bottoms.

13. A wire-cut electrical discharge machining apparatus, comprising:

a pair of guide rollers disposed in parallel and spaced apart from each other;

a wire that forms a parallel wire section between the pair of guide rollers by being engaged between the pair of guide rollers at a plurality of times while separated from each other at fixed intervals, to travel with rotations of the guide rollers;

a pair of vibration-damping guides, disposed between the pair of guide rollers and each having a plurality of grooves spaced apart from each other at the fixed intervals, that forms a plurality of cutting wire sections damped by making press-contact with the parallel wire section; and a plurality of rotatable power feed contacts, each disposed outside the cutting wire sections, that feed power to each of the plurality of cutting wire sections, wherein the vibration-damping guides have circular or N-polygonal cross-sections, N being four or more.

* * * * *